3,753,887
ALKALI METAL SPECIFIC MEASURING
ELECTRODE
Orah Kedem, Rehovot, Ester Loebel, Holon and Mordechai Furmansky, Petch Tikavah, Israel, assignors to Hydronautics, Incorporated, Laurel, Md.
No Drawing. Filed May 25, 1970, Ser. No. 40,350
Claims priority, application Israel, June 4, 1969,
32,341
Int. Cl. G01n 27/46
U.S. Cl. 204—195 M
14 Claims

ABSTRACT OF THE DISCLOSURE

An electrode for measuring the activity of alkali metal ions in solution, a solid membrane comprising a polymeric support material, an uncharged ion carrier and a solvent for the ion carrier in which the solvent may act as a plasticizer for the support and in which the support and the solvent together provide a negative charge to the membrane corresponding to an anion concentration of $10^{-6}$ to $10^{-3}$ milliequivalents per gram of solvent.

---

The present invention relates to membrane electrodes for measuring the activity of specific metal ions in solution. More particularly, the present invention relates to a solid membrane for use in an ion-selective electrode that permits selective measurement of the activity of specific alkali metal ions in preference to other alkali metal ions in the solution.

In the prior art, many systems have been provided for measuring the activity of active concentration of ions in solution. These types of systems usually constitute an electro-chemical cell in which an ion-selective electrode and a reference electrode are placed in contact with the solution. In the cell, the ion-selective electrode produces a potential related to the ionic activity of the particular ion in the solution according to the well-known Nernst equation.

In measuring the ionic activity of a solution which contains more than one type of ion, however, the prior art electrodes have a tendency to indicate the combined activity of all or most of the ions in solution without distinguishing between them. In analyzing solutions such as body liquids, for example, it is frequently necessary to differentiate between ions and particularly to determine the activity of potassium ions in a solution that also contains a high concentration of sodium ions.

One type of electrode previously used to measure potassium ion activity includes a glass membrane interposed between a standard solution and the liquid or test solution to be analyzed. The selectivity of the electrode for potassium ions in preference to sodium ions is achieved by variation of the chemical composition of the glass membrane. One disadvantage of the glass membrane, however, is that its ion selectivity cannot be accurately predicted. Further, and due to their glass construction, such electrodes are extremely fragile.

In addition, these prior art electrodes with glass membranes have been found only to operate satisfactorily for the determination of potassium when the maximum ratio between sodium ion concentration and potassium ion concentration is about 20 to 1. In many instances, however, it is necessary to determine potassium ion activity in solutions that have a much greater ratio of sodium to potassium ion concentrations.

Accordingly, it is desirable to provide a membrane for use in an ion-selective specific measuring electrode that has predictable selectivity for particular ions, that is capable of operating satisfactorily in solutions containing a high concentration of other ions with respect to the concentration of the particular ion of interest and particularly with respect to potassium ions in the presence of other alkali metal ions and which is of more rugged construction, is more accurate, and is more reliable than glass membrane electrodes.

In accordance with the present invention, and as embodied and broadly described, a solid membrane is provided for use in a specific measuring electrode comprising a polymeric support, an uncharged ion carrier and a solvent for the ion carrier in which the solvent may act as plasticizer for the support, and in which the support and the solvent together provide a negative charge to the membrane corresponding to an anion concentration of $10^{-6}$ to $10^{-3}$ milliequivalents per gram of solvent.

It has been observed that the selectivity of a specific measuring electrode embodying the membrane of the present invention is much greater than the selectivity obtainable with the prior art electrodes. The electrode of the present invention has been found, for example, to have a selectivity of better than 10,000 to 1 for potassium over sodium and, thus, can be used to measure the activity of minute concentrations of potassium ions in solutions that also have a very large concentration of sodium or other alkali metal ions without significant interference by such ions.

In accordance with the invention, a sheet of porous material is provided as the porous support of the membrane. The support can be made from suitable natural or synthetic plastics such as a porous sheet of cellulose acetate-nitrate, cellulose acetate, porous polyvinylchloride, plate of porous sintered glass, or the like.

Further, and in accordance with the invention, an electrically uncharged ion carrier dissolved in a suitable solvent is applied to the support to form the membrane. The ion carrier used in the present invention is an electrically uncharged organic substance capable of selectively associating or binding to itself only the desired specific alkali metal ion in such a manner that the positive charge of the ion remains free. The manner in which the alkali metal ion becomes associated with the carrier is not fully understood but it may be thought of as a steric trapping rather than a complexing by coordination. Sutiable uncharged ion carriers are more fully described below.

The solvent for the ion carrier can be any suitable organic hydrophobic solvent meeting the following requirements:

(a) the ion carrier should readily dissolve in it
(b) together with the support it should provide the required negative charge to the membrane
(c) it must plasticize the plastic material of the support In accordance with the invention, and to provide an electrode that is highly specific to certain ions and particularly to potassium ions, it is essential that the membranes of the electrode have a slight negative charge that corresponds to an anion concentration in the range of about $10^{-6}$ to $10^{-3}$ milliequivalents per gram of solvent. Only when the membrane carries this negative charge has it been found that the potassium activity can be measured.

This charge may be derived from either the porous support used in the membrane or from the solvent for the uncharged ion carrier or from both. When the negative charge is derived from the support, e.g. in the case of a support composed of cellulose acetate-nitrate, an electrically neutral solvent such as bromobenzene should be used. When the charge is derived from the solvent, as in the case of certain esters which normally contain a small proportion of free acid, such as tributylphosphate, dibutylphthalate, or sebacates, or oligomeric phosphate ester plasticizers such as oligomeric polyvinyl phosphonates and the like which act as both solvents and plasticizers, the material of the support should be electrochemically neutral.

In addition, the negative charge may be achieved by selecting the materials of the support and the solvent so that they both contribute to the creation of the proper negative charge.

The selectivity of the electrode for a particular ion is due to the chemical nature of the ion carrier and, thus, the use of different chemical components as the uncharged ion carrier provides different membranes for use in different ion selective electrodes. Exemplary of such components are a large number of substances, some of them known to be antibiotics which include:

(1) Valinomycin, a potassium selective, (over sodium) ion carrier that imparts to a membrane constructed in accordance with this invention of a specific measuring electrode, a potassium ion selectivity of the order of $10^4$, and an ammonium ion selectivity (over sodium) of the order of $10^2$;

(2) Cyclic polyethers of various constitution which make the members selective to lithium, rubidium, cesium or sodium; and (3) Other substances having a potassium ion selectivity similar to valinomycin, such as other substances of the valinomycin group; tetralactones; macrolide actins (monactin, nonactin, dinactin, trinactin); the enniatin group (enniatin A, B); cyclohexadepsipeptides; gramicidin; nigericin; dianemycin; nystatin; monensin; and alamethicin (cyclic polypeptides).

The invention is described in more detail below in its application to a potassium ion selective electrode. While a membrane for use in potassium ion specific electrodes represents a preferred embodiment of the present invention, it is to be understood that the principles of the present invention are also applicable to other ion specific electrodes.

To prepare a potassium selective membrane, one of the following two methods is applied for the incorporation of the potassium selective liquid phase into the membrane matrix: in a first technique a sheet of cellulose acetate having a required negative charge and a graded porosity of about 25 millimicrons is used as a support of the membrane. The support is then imbibed with a potassium selective ion carrier, such as valinomycin dissolved in a plasticizer capable of plasticizing cellulose acetate, such as dimethyl sebacate. In an alternative technique the carrier polymer such as cellulose acetate with the required charge density, the potassium selective ion carrier such as valinomycin and the solvent-plasticizer such as dimethyl sebacate may be dissolved in a common solvent such as acetone. The mixture may be cast on a suitable surface and the resulting liquid layer evaporated to obtain a solid polymeric film containing both the ion carrier and the plasticizer in molecular distribution.

In the case of cellulose acetate, the required negative charge of $10^{-6}$ to $10^{-3}$ milliequivalents per gram of solvent, can be obtained from a variety of chemical additives or reactions. An example of a reaction which can be used to achieve the fixed negative charges in the support is oxidation of the cellulose acetate with potassium permanganate to provide negatively charged carboxyl groups fixed to the support. Another example is reaction with a dichloro-azinyl dye to provide negatively charged sulfonic groups fixed to the support.

The number of charged groups obtained can be controlled by varying the conditions (time, temperature, concontration, etc.) of the reaction. Since the required negative charge density of the support is relatively small and is difficult to determine, it is more convenient to produce the membrane by first preparing cellulose acetate with a relatively high negative charge density and then mixing it with untreated cellulose acetate in the required proportions to achieve the desired negative charge. The negative charge or ion-exchange capacity of the highly charged cellulose acetate can be ascertained prior to its mixture with the uncharged cellulose acetate to determine the amount of uncharged cellulose acetate that should be added.

In addition, and as set forth above, the required negative charge can also be provided by using a support of cellulose acetate-nitrate which have fixed negative charges or by using a plasticizer solvent having free acid groups.

It has been found that a potassium selective membrane constructed in accordance with the preferred embodiment develops a good linear Nernstian slope, i.e. a linear change of the potential with the logarithmic ratio of the potassium ion activities in the test solution and the standard solution. The potential is linear within a range of potassium ion activities of the order of $10^{-5}$ to 1 mole per liter. The potassium ion activity can easily be measured in a lower range, e.g. from $10^{-5}$ to $10^{-7}$ moles per liter, with the aid of calibration curves. The potentials are completely reproducible with any number of samples of the same membrane, all of which have been found to produce the same potential under equal conditions. Thus, only one calibration curve generally has to be established for all electrodes using the same kind of membrane.

With the potassium selective electrode of the present invention, the potential from which the potassium ion activity is to be determined is not affected by the presence of large amounts of sodium, hydrogen, calcium or magnesium ions in the solution to be tested. It is only slightly affected by the presence of ammonium ions. In operation, the electrode determines the ion activity in the solution with immediate response and it has an excellent sensitivity. It can measure changes in concentration of about 0.2% with a standard solution of $10^{-3}$ moles per liter of KCl.

In the foregoing, only the membrane of the electrode has been described. The complete measuring electrode, of course, includes a reservoir for the standard or reference solution with the membranes interposed between the reference solution and the test solution, and an electric conductor leading to a measuring instrument. For more details of the construction of an ion specific electrode for use with the solid membranes of the present invention reference is made to copending U.S. application Ser. No. 84,300 filed Oct. 27, 1970, now U.S. Pat. No. 3,700,576, and enentitled Ion Activity Measuring Electrode and assigned to the same assignee as the present invention.

Reference will now be made to the following examples to illustrate the invention more specifically. The examples are merely illustrative and are not to be understood as limiting the scope and underlying principles of the invention in any way.

EXAMPLE 1

In the preparation of a solid membrane according to the present invention, a porous cellulose acetate support having fixed charges in the form of sulfonic groups is produced by preparing a suspension of five (5) grams of cellulose acetate in twenty-five (25) ml. of an aqueous solution containing 3% dichloroazinyl dye and 10% potassium carbonate. The reaction mixture is stirred at ambient temperature for ten (10) minutes, then filtered and thoroughly washed to remove the unreacted dye. The concentration of fixed charges in the cellulose acetate is determined from its exchange capacity as $4 \times 10^{-6}$ moles/liter.

The modified cellulose acetate is subsequently diluted with untreated cellulose acetate to obtain a fixed charge concentration of $10^{-6}$ moles/liter. The resulting polymer is dissolved in dimethyl sulfate and then applied to a glass plate, and the glass plate immersed in water. A porous membrane having the required charge density is thereby obtained, and this membrane is then immersed for ten (10) hours in a solution of 12 mg. of valinomycin in 3 ml. of a 4:1 mixture of dibutyl sebacate and dimethyl sebacate.

The membrane is then incorporated in a membrane electrode and tested using a reference solution of $1.0 \times 10^{-3}$ moles per liter KCl. In the testing, in which the ion activity of the test solution is determined by measuring the electric potential set up between the test solution and the reference solution separated by the membrane, the membrane developed a linear Nernstian slope, i.e., a linear change of the potential with the logarithmic ratio of poassium ion activity in the test solution and the reference solution.

Its operation was unaffected by a 9000 fold excess of sodium or calcium ions and by pH changes from 1.1 to 9.6. Further, it was only slightly affected by $NH_4$ ions when these were in 60-fold excess over the potassium ions. The potassium selective electrode was able to detect concentration changes of 0.1% in the range of $10^{-3}$ moles concentration. The operating life of the electrode was about 500 working hours.

EXAMPLE 2

In the preparation of a solid membrane according to the present invention, a mixture of 125 milligrams of cellulose acetate (carrying the required charge density in the form of grafted dichloro-azinyl dye) 250 milligrams dimethyl phthalate and 3.2 milligrams valinomycin was dissolved in 500 mg. acetone. The solution was poured on a horizontal glass plate. After evaporation of the acetone a solid plastic film was obtained.

When tested as potassium specific membrane electrode, a Nernst potential curve with correct slope was obtained with potassium chloride test solutions of concentrations between $10^{-5}$ to 1 mole per liter when measured against standard KCl solutions of $1.048 \times 10^{-3}$ moles concentration. The potential was unaffected by a 9000-fold excess of sodium, calcium and magnesium ions over potassium ions; and it was only slight affected by an 80-fold excess of ammonium ions.

EXAMPLE 3

In this example a solid membrane similar to the membrane of Example 1 is prepared by immersing a sheet of cellulose acetate-nitrate in a solution of 12 mg. of gramiciden in 3 ml. of dibutylsebacate.

The results of tests of this membrane with a standard solution of about $10^{-3}$ moles/liter of KCl were substantially the same as achieved in Example 1.

EXAMPLE 4

In this example a solid membrane was prepared by immersing a porous sheet of cellulose acetate-nitrate, having the proper negative charge density, in a solution of 8 mg. monensin in salt form in 1 ml. ethylhexyldiphenylphosphate. The resulting membrane when tested as membrane electrode was found to be sodium selective. A Nernst potential curve with correct slope was obtained with sodium chloride solution of concentrations between $10^{-5}$ to 1 mole per liter. The performance of the membrane was not substantially affected by a 100 fold excess of potassium.

EXAMPLE 5

In this example a solid membrane was prepared by immersing a porous sheet of cellulose acetate-nitrate having the proper negative charge density in a solution of 10 mg. nonactin in 4 ml. dibutylsebacate. The resulting membrane when teested as membrane electrode was found to be ammonium selective. A Nernst potential curve with correct slope was obtained, with ammonium chloride solution of concentrations between $10^{-5}$ to 1 mole per liter. The performance of the membrane was not substantially affected by a 10 fold excess of potassium.

The invention in its broader aspects is not limited to the specific details described and shown, and modifications may be made in the details of the membrane for a specific measuring electrode without departing from the principles of the present invention.

What is claimed is:

1. A solid membrane for use in a specific ion measuring electrode comprising a porous support; an antibiotic as an uncharged ion carrier; and a solvent for the ion carrier, in which the support and the solvent together provide a negative charge to the membrane corresponding to an anion concentration of $10^{-6}$ to $10^{-3}$ milliequivalents per gram of solvent.

2. A solid membrane for use in an alkali metal ion measuring electrode comprising a polymeric support, an antibiotic as an uncharged ion carrier and a solvent for the ion carrier, in which the support and the solvent together provide a negative charge to the membrane corresponding to an anion concentration of $10^{-6}$ to $10^{-3}$ milliequivalents per gram of solvent.

3. The membrane of claim 2, wherein the support is a negatively charged sheet of cellulose acetate-nitrate.

4. The membrane of claim 2, wherein the support is a sheet of cellulose acetate having fixed charge groups in the form of grafted-on carboxyl or sulfonic groups.

5. The membrane of claim 2, wherein the antibiotic ion carrier is selected from the group consisting of valinomycin; tetralactones; macrolide actins; the enniatin groups; cyclohexadepsipeptides; gramicidin; nigericin; dianemycin; nystatin; monensin; and alamethicin.

6. The membrane of claim 2, wherein the polymer support is a porous plastic material and the solvent also serves as a plasticizer for the support.

7. The membrane of claim 6, wherein the plasticizer is an alkylphosphate, alkylphthalate or alkylsebacate.

8. The membrane of claim 2, wherein the support is a non-porous plastic film, the solvent serving as a plasticizer for this plastic film.

9. A solid membrane for use in a potassium ion measuring electrode which comprises:
a polymeric porous support saturated with an antibiotic as a potassium-selective, uncharged ion carrier dissolved in a non-water soluble solvent for the ion carrier, said support and solvent together providing a negative charge to the membrane corresponding to an anion concentration of $10^{-6}$ to $10^{-3}$ milliequivalents per gram of solvent.

10. The membrane of claim 9, wherein said uncharged ion carrier is valinomycin.

11. The membrane of claim 10, wherein said porous support is a negatively charged sheet of cellulose acetate-nitrate.

12. The membrane of claim 11, wherein the solvent is a mixture of dimethylsebacate and dibutylsebacate.

13. A solid membrane for use in a sodium ion measuring electrode, which comprises:
a porous support of negatively charged cellulose acetate saturated with esterified monensin or monensin in salt form as sodium selective uncharged ion carrier dissolved in ethylhexyl-diphenylphosphate as solvent for the ion carrier, said support and solvent together providing a negative charge to the membrane corresponding to an anion concentration of $10^{-6}$ to $10^{-3}$ milliequivalents per gram of solvent.

14. A solid membrane for use in an ammonium ion measuring electrode, which comprises:
a porous support of negatively charged cellulose acetate saturated with nonactin as ammonium selective uncharged ion carrier dissolved in dibutyl sebacate as solvent for the ion carrier, said support and solvent together providing a negative charge to the membrane corresponding to an ion concentration of $10^{-6}$ to $10^{-3}$ milliequivalents per gram of solvent.

References Cited

UNITED STATES PATENTS

| | | | |
|---|---|---|---|
| 2,827,426 | 3/1958 | Bodamer | 204—180 P |
| 3,438,886 | 4/1969 | Ross | 204—195 |
| 3,448,032 | 6/1969 | Settzo et al. | 204—195 |
| 3,562,129 | 2/1971 | Simon | 204—195 |
| 3,450,631 | 6/1969 | Bloch et al. | 204—195 M |
| 3,398,066 | 8/1968 | Ilani | 204—195 L |
| 3,655,526 | 4/1972 | Christian | 204—195 T |

OTHER REFERENCES

Shatkay, "Analytical Chemistry," August 1967, vol. 39, No. 10, pp. 1056–1065.

TA-HSUNG TUNG, Primary Examiner

U.S. Cl. X.R.

204—195 B, 195 L